United States Patent
Moradpour et al.

(10) Patent No.: US 8,385,184 B2
(45) Date of Patent: Feb. 26, 2013

(54) DEVICE AND METHOD FOR INFORMATION MASS STORAGE

(75) Inventors: Alexandre Moradpour, Paris (FR); Olivier Schneegans, Antony (FR); Oana Georgiana Dragos, Iasi (FR); Sylvain Franger, Gif-sur-Yvette (FR); Nita Dragoe, Villebon sur Yvette (FR); Loreynne Pinsard-Gaudart, Gometz le Chatel (FR); Alexandre Revcolevschi, Boulogne (FR)

(73) Assignees: Centre National de la Recherche Scientifique, Paris (FR); Universite Paris Sud Xi, Orsay Cedex (FR)

( * ) Notice: Subject to any disclaimer, the term of this patent is extended or adjusted under 35 U.S.C. 154(b) by 161 days.

(21) Appl. No.: 12/597,791

(22) PCT Filed: Apr. 25, 2008

(86) PCT No.: PCT/FR2008/000595
§ 371 (c)(1),
(2), (4) Date: Jan. 26, 2010

(87) PCT Pub. No.: WO2008/145864
PCT Pub. Date: Dec. 4, 2008

(65) Prior Publication Data
US 2010/0195475 A1    Aug. 5, 2010

(30) Foreign Application Priority Data
Apr. 27, 2007 (FR) ...................................... 07 03093

(51) Int. Cl.
*G11B 9/00* (2006.01)

(52) U.S. Cl. ...................... 369/126; 428/800; 428/692.1

(58) Field of Classification Search .................. None
See application file for complete search history.

(56) References Cited

U.S. PATENT DOCUMENTS

| | | | | |
|---|---|---|---|---|
| 5,132,934 A | * | 7/1992 | Quate et al. | 369/126 |
| 5,202,788 A | * | 4/1993 | Weppner | 359/270 |
| 6,487,106 B1 | * | 11/2002 | Kozicki | 365/153 |
| 6,519,221 B1 | * | 2/2003 | Manalis et al. | 369/126 |
| 2003/0173612 A1 | * | 9/2003 | Krieger et al. | 257/304 |
| 2004/0057372 A1 | * | 3/2004 | Schut et al. | 369/126 |
| 2005/0156271 A1 | * | 7/2005 | Lam et al. | 257/500 |
| 2005/0276143 A1 | * | 12/2005 | Busta | 365/222 |
| 2006/0153049 A1 | * | 7/2006 | Park et al. | 369/126 |
| 2006/0291364 A1 | * | 12/2006 | Kozicki | 369/126 |
| 2008/0199719 A1 | * | 8/2008 | Lee et al. | 428/607 |

OTHER PUBLICATIONS

International Search Report from International Application No. PCT/FR2008/000595, filed Apr. 25, 2008.

* cited by examiner

*Primary Examiner* — Kevin Bernatz
(74) *Attorney, Agent, or Firm* — Alston & Bird LLP

(57) ABSTRACT

A device for mass storage of information, the device comprising: a substrate (30); an electrically-conductive tip (10) for atomic force microscopy located above the surface (31) of said substrate (30) in electrical contact therewith; and a voltage generator (41) for applying a potential difference between said tip (10) and said substrate (30); the device being characterized in that: said substrate (30) has a surface (31) of a material presenting electrical conductivity that is both electronic and ionic in nature; and in that said generator (41) is adapted to apply a potential difference that is sufficient to induce a redox reaction of said material that modifies the surface electrical conductivity of the substrate (30). The use of such a device (1) for mass storage of information.

12 Claims, 1 Drawing Sheet

DEVICE AND METHOD FOR INFORMATION MASS STORAGE

CROSS REFERENCE TO RELATED APPLICATIONS

This application is a national stage application filed under 35 U.S.C. 371 of International Application No. PCT/FR2008/000595, filed Apr. 25, 2008, which claims priority from French Application No. 07/03093, filed Apr. 27, 2007.

FIELD AND BACKGROUND OF THE INVENTION

The invention relates to a device for mass storage of information, and also to a method of storing information with the help of said device.

Numerous techniques are known in the prior art for mass storage of information. Amongst the techniques in most widespread use, mention can be made of non-volatile semiconductor memories, magnetic tapes or disks, and optical disks.

Present-day (magnetic) hard disks present storage density of the order of 100 gigabits per square inch (Gbit/in$^2$) where 1 Gbit=10$^9$ bits. Higher densities (up to 400 Gbit/in$^2$) can be achieved in the laboratory with the help of the perpendicular magnetic recording technique. Conventional optical disks present lower recording densities, with the exception of holographic disks, but they are still at an experimental stage, and in any event they are not rewritable.

The techniques that appear to be the most promising for obtaining ultrahigh information storage densities, of the order of 1 terabit per square inch (Tbit/in$^r$) or more, where:

$$1 \text{ Tbit}=10^3 \times \text{Gbits}=10^{12} \text{ bits}$$

are based on using microtips and they are derived from scanning microscope technologies such as atomic force or tunnel effect microscopy. The article by D. Saluel and J. M. Fedeli entitled "L'enregistrement ultra haute densité device micropointes" [Ultrahigh density recording with microtips], published in Signaux No. 94, September 1999, pp. 9 to 22, summarizes those techniques that are based on principles as varied as storing charge, changing phase, and magnetic recording.

SUMMARY OF THE INVENTION

An object of the invention is to provide a novel technique for mass storage of information at ultrahigh density, the technique being of the microtip type, based on making use of an electrochemical effect. This technique, which is relatively simple to implement, may advantageously be reversible, which means that it is possible to delete information that has been recorded and that the recording medium can be reused an indefinite number of times.

More precisely, the invention provides a device for mass storage of information, the device comprising: an information storage substrate; an electrically-conductive tip for atomic force microscopy located above a surface of said substrate, in electrical contact therewith; and means for applying a potential difference between said tip and said surface of the substrate; the device being characterized in that: said surface of the information storage substrate is constituted by a material presenting electrical conductivity that is both electronic and ionic in nature; and in that said means for applying a potential difference between said tip and said surface of the substrate are adapted to apply a potential difference that is sufficient to induce a redox reaction of said material, modifying its electrical conductivity.

In particular embodiments of the device of the invention:

Said device may also comprise means for measuring the surface electrical conductivity of said substrate by means of said tip for atomic force microscopy, or of a second such tip.

Said device may also comprise actuator means for actuating the tip and/or the surface of the substrate to enable said surface to be scanned by said tip.

A water meniscus may be present between said tip and said surface.

Said means for applying a potential difference between said tip and said substrate may be adapted to apply a potential difference having an absolute value lying in the range 0.5 volts (V) to 10 V, and of polarity that can be reversed.

Said means for applying a potential difference between said tip and said substrate may be adapted to apply a plurality of discrete potential difference values inducing discrete variations in the surface electrical conductivity of said substrate.

Said device may also comprise means for maintaining said substrate in a protective atmosphere, having no or little oxygen and carbon dioxide.

The material of the substrate presenting electrical conductivity that is both electronic and ionic in nature may satisfy the following formulation:

$$A_x(M_1)_v(M_2)_w(M_3)_y(M_4)_z B_\beta$$

where: A represents one or more alkali metals; $M_1$ represents at least one metal selected from Ag and Cu; $M_2$ represents at least one metal selected from Mg, Ca, Sr, Ba, Ti, Mn, Fe, Cu, Ta, and Zn; $M_3$ represents at least one metal selected from Al, Ti, V, Cr, Mn, Fe, Co, Ni, Mo, and Ta; $M_4$ represents at least one metal selected from Ti, V, Mn, Co, Ni, Zr, Sn and Ta; and B represents at least one non-metal selected in particular from O, S, Se, and Te the parameters x, v, w, y, z, and β must satisfy the following inequalities, x also being selected to lie in the stability domain of the compounds:

$0 \leq x \leq 1$;
$0 \leq v \leq 1$;
$0 \leq w < 1$;
$0 \leq y \leq 1$;
$0 \leq z < 1$;
$1.5 \leq \beta \leq 2$;

and the parameters x, v, w, y, z, and β also satisfy the following equalities:

$$v+w+y+z=1;$$

$$x+v+2w+3y+4z-2\beta=0.$$

More particularly, the material of the substrate presenting electrical conductivity that is both electronic and ionic in nature constituting said substrate may satisfy the following formulation:

$$A'_x M_y B_\beta,$$

where: A' represents at least one alkali metal selected from Li and Na; M represents at least one metal selected form Mn, Fe, Co, and Ni; B represents at least one non-metal selected from O and S; the parameters x, y, and β satisfy the following inequalities, x also being selected to lie in the stability domain of the compounds:

$0 \leq x \leq 1$;
$0 < y \leq 1$;

$1.5 \leq \beta \leq 2$;
and the parameters x, y, and p also satisfy the equality:

$$x+y-2\beta=0.$$

Still more particularly, said material may be selected from the following: $Na_xCoO_2$, $Li_xCoO_2$, $Li_xNiO_2$, $Li_xMn_4O_9$, $Li_xTiO_2$, $Li_{4+x}Ti_5O_{12}$, $Li_xV_2O_5$, $Li_xV_6O_{13}$, $Li_xNi_yCo_{(1-y)}O_2$, $Li_xFeO_2$, $Li_xMnO_2$, $Li_xMn_2O_4$, $Li_xMoO_3$, and $Li_xNi_{1/3}Mn_{1/3}Co_{1/3}O_2$, the parameter x being selected to lie in the stability range of said compounds.

In a particularly preferred manner, said material may be selected from $Na_xCoO_2$ and $Li_xCoO_2$.

The material of the substrate presenting electrical conductivity that is both electronic and ionic in nature may have a lamellar structure.

The invention also provides a method of using a device as defined above for mass storage of information, the method comprising: a step of writing information by applying, between said electrically-conductive tip for atomic force microscopy and said substrate, a potential difference that is sufficient to induce a redox reaction of said substrate, thereby modifying its surface electrical conductivity; and a step of reading the information as recorded in this way by measuring the surface electrical conductivity of said substrate by means of said electrically-conductive tip for atomic force microscopy, or of a second such tip, said measurement comprising applying a potential difference that is not sufficient for inducing a redox reaction of said substrate that would modify said surface electrical conductivity.

In particular implementations of the method of the invention:

Said writing step may comprise applying a potential difference selected from amongst a plurality of discrete values, of polarity that can be reversed, in such a manner as to induce discrete variations in the surface electrical conductivity of said substrate.

The method may also include a step of erasing the written information by applying, between said electrically-conductive tip for atomic force microscopy and said substrate, a potential difference of sign opposite to the sign used during the writing step.

BRIEF DESCRIPTION OF THE DRAWINGS

Other characteristics, details, and advantages of the invention appear on reading the following description made with reference to the accompanying drawing given by way of example, and in which.

MORE DETAILED DESCRIPTION

Figure 1:
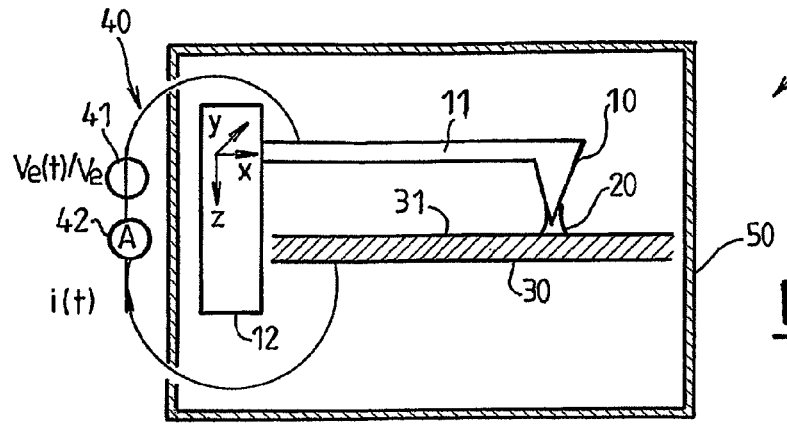
FIG. 1 is a diagrammatic view of an information mass storage device of the invention.

The device of FIG. 1 includes an electrically-conductive tip 10 for atomic force microscopy, which tip is disposed at a free end of a cantilever 11 having its other end fixed to a piezo-electric actuator 12 enabling three-dimensional movements to be driven with nanometer resolution. Generally, the conductive tip 10 is made of silicon and it is covered in a doped diamond layer.

The tip 10 is located above the surface 31 of a storage substrate 30 at a distance therefrom lying in the range 0 (direct contact between the tip and the surface) and about 100 nanometers (nm). A water meniscus 20 forms spontaneously between the tip 10 and the surface 31 by condensation of ambient humidity, and this occurs even in an atmosphere that is very dry. The meniscus 20 provides electrical contact between the tip 10 and the surface 31 and it constitutes an electrochemical cell of nanometer size with the surface and the tip constituting the electrodes thereof.

The storage substrate 30 is essentially constituted by a material presenting electrical conductivity of a nature that is both electronic (like a metal) and ionic. A material of this type is generally constituted by associating a metal oxide with an alkali metal: by way of example it may be one of the materials used for making lithium batteries. More precisely, such materials can be characterized by the general formula:

$$A_x(M_1)_v(M_2)_w(M_3)_y(M_4)_zB_\beta$$

where:
A represents one or more alkali metals;
$M_1$ represents at least one metal capable of taking an oxidation number equal to 1, and more particularly selected from Ag and Cu;
$M_2$ represents at least one metal capable of taking an oxidation number equal to 2, and more particularly selected from Mg, Ca, Sr, Ba, Ti, Mn, Fe, Cu, Ta, and Zn;
$M_3$ represents at least one metal capable of taking an oxidation number equal to 3, and more particularly selected from Al, Ti, V, Cr, Mn, Co, Ni, Mo, and Ta;
$M_4$ represents at least one metal capable of taking an oxidation number equal to 4, and more particularly selected from Ti, V, Mn, Fe, Co, Ni, Zr, Sn, and Ta; and
B represents at least one non-metal selected in particular from O, S, Se, and Te.

The parameters x, v, w, y, z, and β must satisfy the following inequalities:
$0 \leq x \leq 1$;
$0 \leq V \leq 1$;
$0 \leq w \leq 1$;
$0 \leq y \leq 1$;
$0 \leq z < 1$; and
$1.5 \leq \beta \leq 2$.

Furthermore, x needs to take a value serving to ensure chemical stability of the compound (the stability ranges for the parameter x depend on the qualitative composition of the material).

The parameters x, v, w, y, z, and β also need to satisfy the following equalities:

$$v+w+y+z=1 \text{ and } x+v+2w+3y+4z-2\beta=0$$

Advantageously, the material of the recording medium 30 may be characterized by the general formula $A'_xM_yB_\beta$ where:
A' represents at least one alkali metal selected from Li and Na;
M represents at least one metal selected form Mn, Fe, Co, and Ni;
B represents at least one non-metal selected from of and S;
the parameters x, y, and β satisfy the following inequalities, x also being selected to lie in the stability domain of the compounds:
$0 \leq x \leq 1$;
$0 < y \leq 1$;
$1.5 \leq \beta \leq 2$; and
the parameters x, y, and β also satisfy the equality:

$$x+y-2\beta=0$$

Particular mention may be made of the following materials: $Na_xCoO_2$, $Li_xCoO_2$, $Li_xNiO_2$, $Li_xMn_4O_9$, $Li_xTiO_2$, $Li_{4+}$ $_x$Ti$_5$O$_{12}$, Li$_x$V$_2$O$_5$, Li$_x$V$_6$O$_{13}$, Li$_x$Ni$_y$Co$_{(1-y)}$O$_2$, Li$_x$FeO$_2$, Li$_x$MnO$_2$, Li$_x$Mn$_2$O$_4$, Li$_x$MoO$_2$, and Li$_x$Ni$_{1/3}$Mn$_{1/2}$CO$_{1/3}$O$_2$.

Na$_x$CoO$_2$, Li$_x$CoO$_2$ are particularly preferred.

The material may be hydrated, i.e. it may include water incorporated in its crystal structure, however that is not generally desired since the presence of water molecules runs the risk of impeding the mobility of alkali metal ions. As shown below, this mobility is essential for the operation of the invention.

It is advantageous for the substrate 30 to be monocrystalline.

Figure 2:
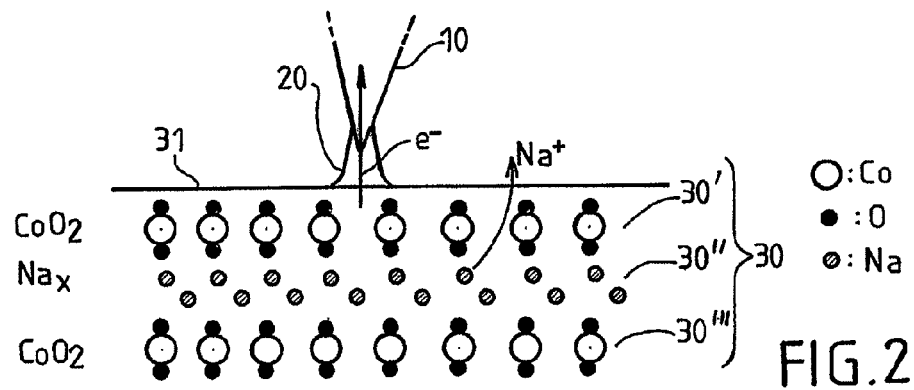
FIG. 2 is a detail view of the FIG. 1 device, showing its operating principle in diagrammatic manner.

As shown in FIG. 2, with the particular example of the material Na$_x$CoO$_2$, the substrate 30 may present a lamellar crystal structure. For example, Na$_x$CoO$_2$ is constituted by a layer 30" of Na+ ions lying between two monomolecular layers 30' and 30'" of CoO$_2$. The Na+ ions are relatively mobile because of their small size and they provide conductivity of ionic nature.

The materials constituting the substrate 30 are generally unstable in air. In particular, Na$_x$CoO$_2$ tends to oxidize, and also to react with CO$_2$ to form insulating carbonates. It is therefore necessary to maintain the substrate 30 in a protective atmosphere, e.g. by enclosing it together with the tip 10 in a sealed housing 50.

A voltage generator 41 serves to establish a time-varying potential difference V$_e$(t) between the substrate 30 and the tip 10. The electric circuit 40 is closed by the water meniscus 20, thereby allowing an electric current i(t) to pass. FIG. 2 shows what happens when the tip 10 is taken to a potential lower than that of the substrate 30, with the potential difference being beyond a critical value which, for Na$_x$CoO$_2$, is equal to about 0.5 volts (V). Under such conditions, a redox reaction, and more particularly oxidation of the substrate 30, occurs locally in the nano-electrolytic cell formed by the water meniscus 12, with the tip 10 constituting the cathode and the surface 31 the anode. During this reaction, the oxidation number of a certain number of cobalt atoms increases by one (or more) units and electrons e$^-$ travel from the substrate to the tip; in order to maintain electrical neutrality of the substrate, a corresponding number of Na$^+$ ions is expelled from the body of the material and become deposited on its surface: the value of the parameter x is thus modified. However, the surface conductivity of a material such as Na$_x$CoO$_2$ depends specifically on its alkali metal content, with conductivity increasing with decreasing alkali metal content. Consequently, applying a positive potential difference (oxidizing) between the tip and the substrate induces an increase in the electrical conductivity of the substrate.

This effect is reversible: applying a potential difference of opposite polarity (reducing) causes the sodium to go from the surface into the body of the substrate, thereby decreasing the electrical conductivity thereof.

More generally, the principle of the invention is to make use of the existence of a plurality of stable redox states in the material of the substrate 30, which states are associated with structural changes that are preferably reversible, and with modifications that are also reversible to the electrical properties of said material.

By way of example, applying an oxidizing potential difference of +2.5 V to a substrate of Na$_x$CoO$_2$ with x=0.75 gives rise to a local reduction in the parameter x, which in turn induces an increase in conductivity of about two orders of magnitude.

Applying a potential difference that is too small gives rise to hardly any or no variation in conductivity, whereas too great a potential difference (3 V or more maintained for longer than a few seconds with Na$_x$CoO$_2$) gives rise to variations that are not reversible. The range of voltage values that can be used for reversibly writing information depends on the material under consideration, but, generally speaking, its absolute value lies in the range 0.5 V to 10 V, approximately.

Information can thus be written on the surface 31 in the form of variations of electrical conductivity. The information as recorded in this way can be read, e.g. by an ammeter 42 connected in series with the voltage generator 41. During an information-reading stage, the generator 41 applies a potential difference V$_r$ between the substrate 30 and the tip 10 that is not sufficient to induce the above-described electrochemical reaction, and the ammeter 42 measuring the electric current i(t) flowing through the circuit 40 serves to determine the local conductivity of the surface 31. Information is thus read in non-destructive manner.

It is important to emphasize that the variation in conductivity induced by applying the potential difference V$_e$(t) is localized to a region having lateral dimensions of the order of 10 nm or less, located immediately under the tip 10, thus making it possible to achieve an information storage density greater than 1 Tbit/in$^2$. This storage density may be further increased by having recourse to non-binary coding. The variation in the conductivity of the substrate 30 is approximately proportional to the applied voltage V$_e$(t). If the generator 31 is adapted to apply a potential difference V$_e$(t) between the substrate and the tip that is selected from amongst N discrete values (not taking into consideration the low value V$_r$ used for reading), then coding is performed on the basis of an alphabet of N symbols. For example, if N is equal to four, then an individual information storage zone can be used to record 2 bits, thereby doubling storage density compared with binary coding.

Figure 3A:
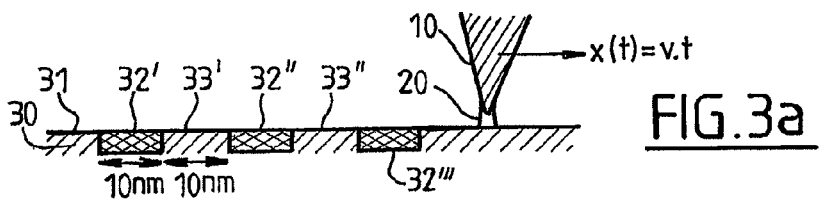
FIGS. 3a, 3b, and 3c show an example of the method of using the FIG. 1 device.
Figure 3B:
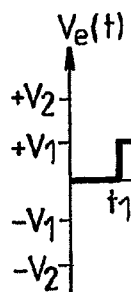
Figure 3C:
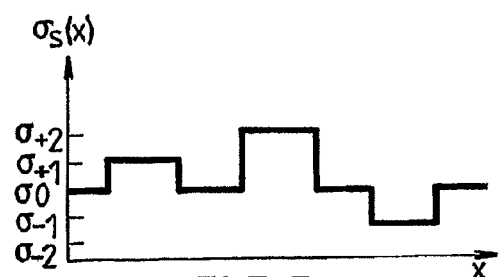

FIGS. 3a, 3b, and 3c show the way in which the FIG. 1 device operates. Under drive from the actuator 12, the tip 10 scans the surface 31 of the substrate 30. To simplify the description, it is assumed that it is moved at a constant velocity v in the direction x: this can be written x(t)=vt. Between time t$_1$ and time t$_2$, the generator 41 applies an oxidizing potential difference V$_e$(t)=+V$_1$, thereby inducing an increase in the surface electrical conductivity of the substrate 30, $\sigma_s$(x), from its initial value $\sigma_0$ to a new value $\sigma_{+1} > \sigma_0$; this results in a first information recording zone 32' that may have a dimension in the x direction of 10 nm, for example. Thereafter, between t$_2$ and t$_3$, the generator 41 remains inactive (V$_e$(t)=0): this results in a first separation zone 33' in which $\sigma_s$(x)=$\sigma_0$. For example, the following may apply t$_3$–t$_2$=t$_2$–t$_1$, which implies that the separation zone 33' presents dimensions equal to those of the first recording zone 32'. Between times t$_3$ and t$_4$, the generator 41 applies an oxidizing potential difference of value +V$_2$, greater than V$_1$, thereby defining a second recording zone 32" of conductivity $\sigma_{+2} > \sigma_{+1}$. Between t$_4$ and t$_5$, V$_e$(t)=0 is maintained to define a second separation zone 33". Then, between t$_5$ and t$_6$, the generator 41 applies a reducing potential difference of value –V$_1$: the third recording zone 32'" thus presents conductivity $\sigma_{-1} < \sigma_0$. If a recording zone of conductivity $\sigma_{-2}$ (obtained for V$_e$(t)=–V$_2$) is assigned the symbol 00, a zone of conductivity the symbol 01, a zone of conductivity $\sigma_{+1}$ the symbol 10, and a zone of conductivity $\sigma_{+2}$ the symbol 11, then the six-bit sequence 101101 has been written in non-volatile but reversible manner on a strip of length 50 nm (and of width equal to about 10 nm, for example) on the surface of the substrate 30.

The storage density could also be increased by making use of the conductivity $\sigma_0$ as a symbol representative of information instead of serving solely to separate recording zones. Under such circumstances, the alphabet would have five symbols instead of four.

To read the information recorded in this way, it suffices to scan the surface 31 again by means of the tip 10, with the generator 41 then maintaining a constant potential difference, e.g. equal to $V_r=0.3$ V: the magnitude of the electric current i(t) flowing in the circuit 40, as measured by the ammeter 42, then provides the conductivity of the surface 31 and thus enables the recorded binary sequence to be reproduced.

The invention is described with reference to one particular embodiment, however numerous variants can be envisaged.

For example, the information written on the surface 31 may be read by means of a second tip that is distinct from the tip 10 used for writing. Any method of measuring the conductivity of a surface may be used for reading the information.

It is also possible to use a plurality of tips operating in parallel, both for writing and for reading information, in application of the "microtip matrix" principle shown in FIG. 20 of the above-mentioned article by D. Saluel and J. M. Fedeli.

Furthermore, the scanning of the surface 31 by the read/write tip(s) may be performed by moving the tip while keeping the substrate stationary, as in the above example, or conversely by moving both the tip and the substrate.

The invention claimed is:

1. A device for mass storage of information, the device comprising:
   an information storage substrate;
   an electrically-conductive tip for atomic force microscopy located above a surface of said substrate, in electrical contact therewith; and
   means for applying a potential difference between said tip and said surface of the substrate;
   the device being characterized in that:
   said surface of the information storage substrate is constituted by a material having a lamellar crystal structure and presenting electrical conductivity that is both electronic and ionic in nature; and
   in that:
   said means for applying a potential difference between said tip and said surface of the substrate are adapted to apply a potential difference that is sufficient to induce a reversible redox reaction of said material, reversibly modifying its electrical conductivity, and consequently the electrical conductivity of the surface of the substrate.

2. A device according to claim 1, also comprising means for measuring the local electrical conductivity of said surface of a material presenting electrical conductivity that is both electronic and ionic in nature by means of said tip for atomic force microscopy, or of a second such tip.

3. A device according to claim 1, also comprising actuator means for actuating the tip and/or the surface of the substrate to enable said surface to be scanned by said tip.

4. A device according to claim 1, including a water meniscus between said tip and said surface.

5. A device according to claim 1, wherein said means for applying a potential difference between said tip and said substrate are adapted to apply a potential difference having an absolute value lying in the range 0.5 V to 10 V, and of polarity that can be reversed.

6. A device according to claim 1, wherein said means for applying a potential difference between said tip and said substrate are adapted to apply a plurality of discrete potential difference values inducing discrete variations in the surface electrical conductivity value of said substrate.

7. A device according to claim 1, also comprising means for maintaining said substrate in a protective atmosphere, having no or little oxygen and carbon dioxide.

8. A device according to claim 1, wherein the material of the substrate presenting electrical conductivity that is both electronic and ionic in nature satisfies the following formulation:

$$A_x(M_1)_v(M_2)_w(M_3)_y(M_4)_z B_\beta$$

where:
   A represents one or more alkali metals;
   $M_1$ represents at least one metal selected from Ag and Cu;
   $M_2$ represents at least one metal selected from Mg, Ca, Sr, Ba, Ti, Mn, Fe, Cu, Ta, and Zn;
   $M_3$ represents at least one metal selected from Al, Ti, V, Cr, Mn, Fe, Co, Ni, Mo, and Ta;
   $M_4$ represents at least one metal selected from Ti, V, Mn, Co, Ni, Zr, Sn, and Ta; and
   B represents at least one non-metal selected from O, S, Se, and Te;
   $M_1$, $M_2$, $M_3$ and $M_4$, if present, being unique from each other,
   the parameters x, v, w, y, z, and β must satisfy the following inequalities, x also being selected to lie in the stability domain of the compounds:
   $0 \leq x \leq 1$
   $0 \leq v \leq 1$
   $0 \leq w < 1$
   $0 \leq y \leq 1$
   $0 \leq z < 1$
   $1.5 \leq \beta \leq 2$
   the parameters x, v, w, y, z, and β also need to satisfy the following equalities:

$$v+w+y+z=1$$

$$x+v+2w+3y+4z-2\beta=0.$$

9. A device according to claim 8, wherein the material of the substrate presenting electrical conductivity that is both electronic and ionic in nature constituting said substrate satisfies the following formulation:

$$A'_x M_y B_\beta$$

where:
   A' represents at least one alkali metal selected from Li and Na;
   M represents at least one metal selected form Mn, Fe, Co, and Ni;
   B represents at least one non-metal selected from O and S;
   the parameters x, y, and β satisfy the following inequalities, x also being selected to lie in the stability domain of the compounds:
   $0 \leq x \leq 1$
   $0 < y \leq 1$
   $1.5 \leq \beta \leq 2$
   the parameters x, y, and β also satisfy the equality:

$$x+y-2\beta=0.$$

10. A device according to claim 8, wherein the material of the substrate presenting electrical conductivity that is both electronic and ionic in nature constituting said substrate is selected from the following: $Na_xCoO_2$, $Li_xCoO_2$, $Li_xNiO_2$, $Li_xMn_4O_9$, $Li_xTiO_2$, $Li_{4+x}Ti_5O_{12}$, $Li_xV_2O_5$, $Li_xV_6O_{13}$, $Li_xNi_yCo_{(1-y)}O_2$, $Li_xFeO_2$, $Li_xMnO_2$, $Li_xMn_2O_4$, $Li_xMoO_3$, and $Li_xNi_{1/3}Mn_{1/3}Co_{1/3}O_2$, the parameter x being selected to lie in the stability range of said compounds.

11. A device according to claim 10, wherein the material of the substrate presenting electrical conductivity that is both electronic and ionic in nature constituting said substrate is selected from $Na_xCoO_2$ and $Li_xCoO_2$.

12. A device according to claim 1, including no other material of electrical conductivity that is suitable for being modified by applying said potential difference between said tip and said surface of the substrate.

* * * * *

UNITED STATES PATENT AND TRADEMARK OFFICE
CERTIFICATE OF CORRECTION

PATENT NO. : 8,385,184 B2
APPLICATION NO. : 12/597791
DATED : February 26, 2013
INVENTOR(S) : Moradpour et al.

Page 1 of 1

It is certified that error appears in the above-identified patent and that said Letters Patent is hereby corrected as shown below:

Title page,
Item (75) Inventors: "Georgiana Dragos, Iasi (FR)" should read --Georgiana Dragos, Iasi (RO)--.

In the Specifications

Column 1,
Line 33, "(Tbit/in$^t$)" should read --(Tbit/in$^2$)--.

Column 3,
Line 2, "p" should read --β--.

Column 4,
Line 36, the equation should read --$0 \leq v \leq 1$--;
Line 37, the equation should read --$0 \leq w < 1$--.

Column 5,
Line 2, "Li$_x$MoO$_2$, and Li$_x$Ni$_{1/3}$Mn$_{1/2}$CO$_{1/3}$O$_2$" should read --Li$_x$MoO$_3$, and Li$_x$Ni$_{1/3}$Mn$_{1/3}$Co$_{1/3}$O$_2$--.

Column 6,
Line 37, "v" should read --ν-- and "vt" should read --νt--;
Line 57, "conductivity the symbol 01" should read --conductivity σ$_{-1}$ the symbol 01--.

Signed and Sealed this
Twenty-eighth Day of May, 2013

Teresa Stanek Rea
*Acting Director of the United States Patent and Trademark Office*